United States Patent [19]
Ozawa

[11] 3,897,341
[45] July 29, 1975

[54] FILTER

[76] Inventor: Masakatsu Ozawa, 207 Mizukami, Fujieda-shi, Shizuoka-ken, Japan

[22] Filed: Feb. 4, 1974

[21] Appl. No.: 439,242

[30] Foreign Application Priority Data
Feb. 7, 1973   Japan.............................. 48-14759
Feb. 7, 1973   Japan.............................. 48-14760

[52] U.S. Cl. ................ 210/386; 100/118; 100/152; 210/401
[51] Int. Cl.......................... B01d 33/02; B30b 9/24
[58] Field of Search ........................ 100/118–120, 100/151–153; 210/386, 387, 400–402, 407

[56] References Cited
UNITED STATES PATENTS

| | | | |
|---|---|---|---|
| 1,032,167 | 7/1912 | Vernsten............................. | 100/118 |
| 2,216,996 | 10/1940 | Weston............................ | 100/118 X |
| 2,229,582 | 1/1941 | Merrill............................ | 210/386 X |
| 2,359,753 | 10/1944 | Devine et al....................... | 210/386 |
| 3,485,366 | 12/1969 | Evans............................. | 210/386 X |
| 3,587,451 | 6/1971 | Luthi ............................. | 100/118 |
| R24,430 | 2/1958 | Hornbostel ........................ | 210/387 |

FOREIGN PATENTS OR APPLICATIONS
389,876   2/1924   Germany ............................ 210/386

*Primary Examiner*—Charles N. Hart
*Assistant Examiner*—Robert H. Spitzer
*Attorney, Agent, or Firm*—Wenderoth, Lind & Ponack

[57] ABSTRACT

This invention relates to a filter for separation of solid and liquid from a muddy substance to be treated by a process of pressurization and dehydration thereof. The filter includes a group of pressure rollers located around the outer periphery of a rotary drum for providing a pushing force toward the center of the drum. A pressure belt, which may take an endless form, is interposed between the drum and the group of pressure rollers and is revolved around the drum. The clearance between the group of the pressure rollers and the drum is made narrower at the side where the substance being treated is output than at a supply side thereof, thereby filtering the substance while pressing the pressure belt.

4 Claims, 12 Drawing Figures

FILTER

BACKGROUND OF THE INVENTION

This invention relates to a filter and more particularly is directed to an apparatus for separation of solid and liquid from muddy substance to be treated by pressurization and dehydration thereof.

Materials disposed according to the present invention can be any muddy substance containing liquid and capable of being separated into a solid and liquid by pressurization thereof.

For instance, it is difficult to throw away or move soil containing an appreciable amount of water, and thus the soil is required to be separated into solid and liquid components. Substance containing much water, even if intended to be subjected to fire, require a large quantity of heat for combustion. This is uneconomical and inefficient. In manufacturing processes of other chemical industries and the food industry, use is made of a solid and liquid separation apparatus in various processes separation of a muddy substance in drainage from factories.

Pressure hydroextractors which have been utilized as such kind of filters to enable a continuous filtering operation are such that substances to be disposed are supplied in a pair of upper and lower pressure belts shaped in the form of a conveyer and pressure rollers are disposed above and below the pressure belts, so that pressurization is provided by means of the pressure force of the pressure rollers. The pressure belts are formed in an endless form by coupling a number of pressure plates with chains. However as the pressure rollers and the pressure belts are pressurized by contact therebetween, a mere increase in pressure force does not provide effective working pressure.

It is also to be noted that, since the substances being treated are in a semiliquid state, increasing the pressure force only causes the substances to slide, so that effective pressurization cannot be provided. Accordingly, the distance between the pressure rollers is made gradually narrower and this has drawbacks in that pressure belts in the form of a conveyor adapted to move horizontally require an apparatus of large size.

It has been heretofore proposed that the pressure belts be arranged on the outer periphery of a rotary tube in order to provide a smaller apparatus, however in such instances the pressure force is unevenly distributed.

SUMMARY OF THE INVENTION

This invention provides a filter of the rotary drum type wherein a pressure force is uniformly provided.

The filter according to the present invention is such that a pressure belt comprising a number of pressure plates coupled in an endless form by a chain is arranged around the periphery of a rotatable drum, a filtering material is wound on the surface of the drum and the pressure belt, so that the pressure belt is driven around the periphery of the drum, and a group of pressure rollers are arranged around the periphery of the drum.

In the filter according to this invention, the driving portion is a pressure belt and the drum and the group of pressure rollers are moved by the pressure belt the filtering material moving coincidentally therewith. However it is required that the group of pressure rollers apply a uniform pressure force to the pressure belt. For this reason, the present invention is such that a guide is provided and arranged along a curved line on which the group of pressure rollers are located. The guide is supported on a pressure adjusting shaft of the pressure rollers and is adapted to always move in synchronism with the group of pressure rollers, thereby to bring the pressure belt to the guide so as to drive the pressure belt to ensure that a compressive force is applied to the substance to be treated.

According to the present invention, the pressure belt is so driven that the group of the pressure rollers is moved and a strong tension is also applied to the filtering material arranged around the pressure belt. When soft substances are being treated, excess tension causes the substance to escape from the predetermined pressing portion with the result that pressurization becomes impossible. As mentioned above, however, when the pressure belt is guided into the guide arranged in synchronism with the pressure roller, the distance between the pressure belt and the drum is maintained regardless of the tension of the filtering material. In this manner a filter can be provided capable of pressing the substance to be treated which may be soft and muddy.

The present invention further provides a filter wherein a sealing structure is provided on either sides of the periphery of the drum to prevent escape of the substance from the pressing portion to ensure that the pressing operation is carried out in cooperation with the structure.

As for pressurization and dehydration of muddy substances, rapid pressurization prevents the substance from escaping. In view of this, the subject application discloses a formation of rugged ridges on the surface of the pressure belt for preventing the escape of the substance under treatment. With the structure providing pressurization for a long time with a small compression ratio, perfect dehydration is expected. In order to achieve this, the diameter of the drum must be very large. However, a continuous arrangement of several drums, each capable of adjusting the compression ratio for pressuring the filtering material achieves the desired dehydration of slippery substance or materials without the necessity of a large drum.

Another object of this invention is to provide a filter comprising a plurality of drums having a group of pressure rollers arranged therearound, which enables filtering of substances containing a great quantity of water.

DETAILED DESCRIPTION OF THE PREFERRED EMBODIMENT

Figure 1:
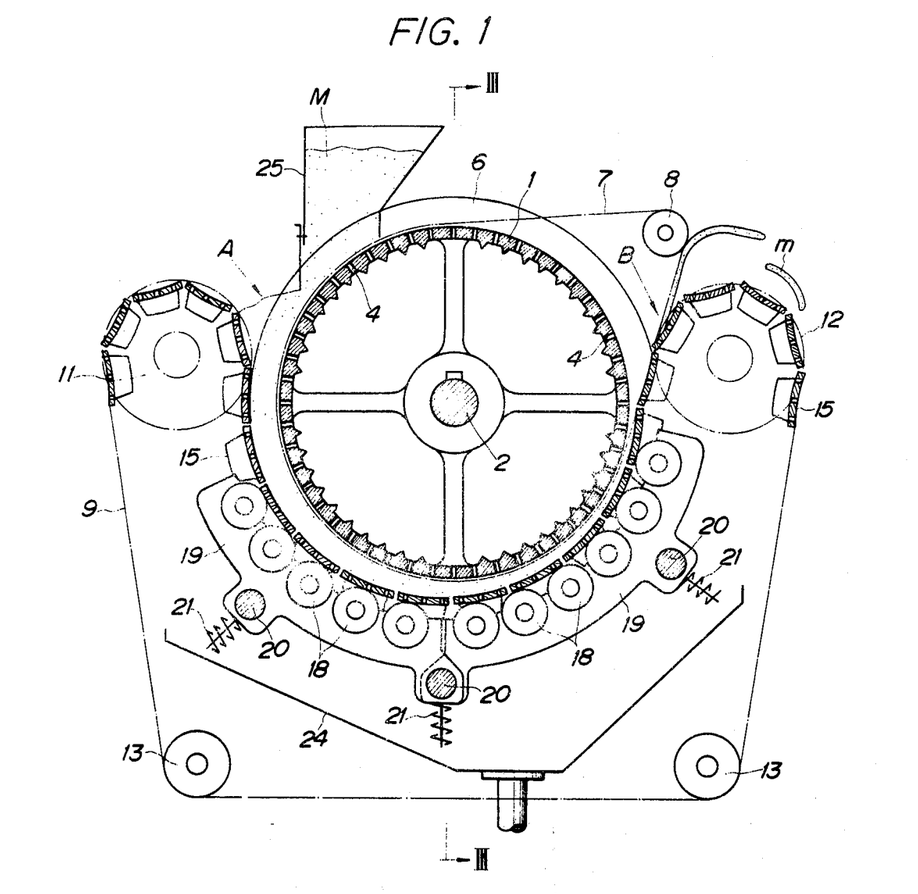
FIG. 1 is partially fragmentary front view of the whole of the filter according to the present invention.
Figure 2:
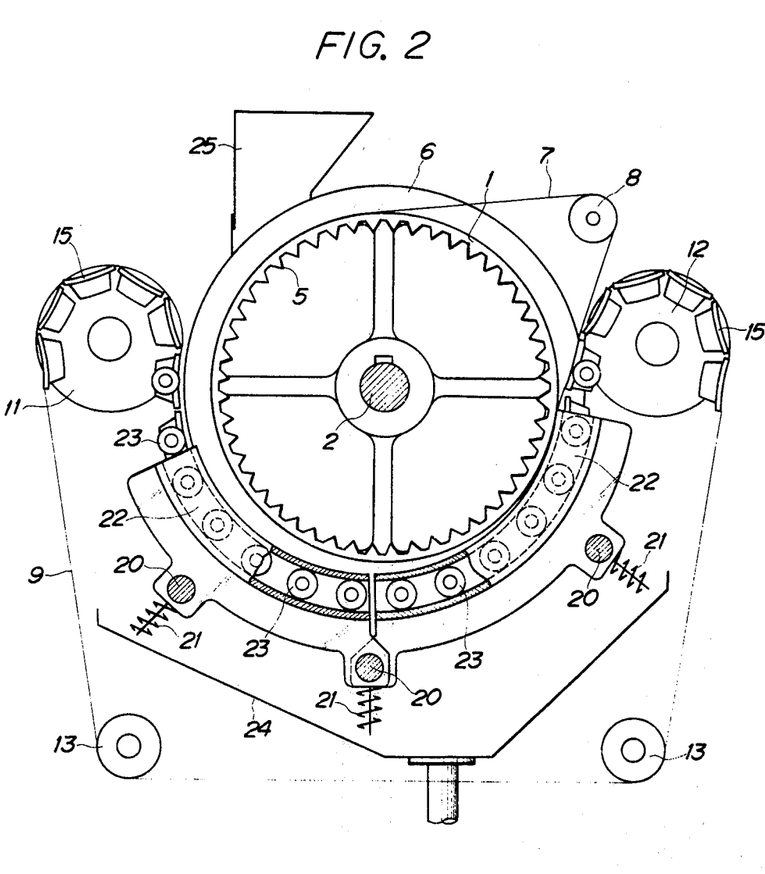
FIG. 2 is also a front view of the whole of the filter.
Figure 3:
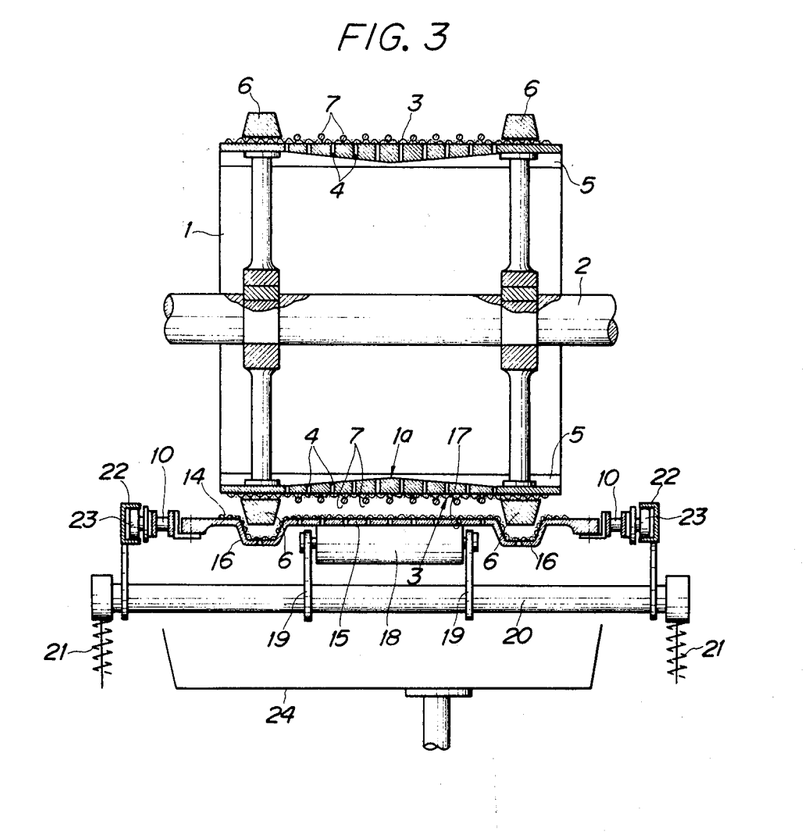
FIG. 3 is a sectional side view taken along the line III — III in FIG. 1.

Referring now to the drawings, there is shown a drum 1 rotatably mounted on a rotary shaft 2. The drum 1 has a filtering material 3 wound therearound and the cross section of the pressure surface thereof has a high central portion 1a and inclined surfaces on its either sides tapering outwardly therefrom. The drum is provided on its peripheral surface with drain holes 4 so that the water pressed out of the substance being treated, upon entering the inside of the drum 1 through the drain holes 4 flows out toward either side of the drum 1. Ribs 5 are formed inside the wall surface and are inclined with respect to the rotary shaft to increase the water outflow.

Cloths are normally used as the filtering material 3. However, any water-permeable material such as metallic net, spongy material, porous rubber and plastic may be used. Rings 6 made of rubber or the like are put on both edges of the periphery of the drum 1 and the pressing operation is effected between these rings. A plurality of ropes 7 are arranged between these rings 6, on the filtering material 3 and the ropes 7 extend around a shaft 8 in the vicinity of a cake removal station. In this manner the solid matter which is obtained by dehydration is guided by the ropes and is removed therefrom at the shaft 8. Material to be treated is indicated by M while dehydrated, treated material is indicated by m.

The pressure belt 9 is an endless belt and is so positioned that it may move adjacent the drum approximately along the lower semi-circular periphery of the drum 1. Chains 10 are arranged on either side of the pressure belt 9 and engaged with chain gears 11 and 12 positioned in front of and behind the drum 1 and chain gears 13 positioned at the lower side of the drum 1. The chain gears 11 positioned on the supply side A for the substance to be treated are driven gears while the chain gears 12 positioned on the cake removing side B are driving gears, and when the pressure belt 9 is moved, the drum 1 is rotated counter-clockwise in FIG. 1. The pressure belt 9 has a filtering material 14 having the same structure as described above around there and this is effective in extracting water obtained from the substance to be treated by pressure thereon.

Figure 4:
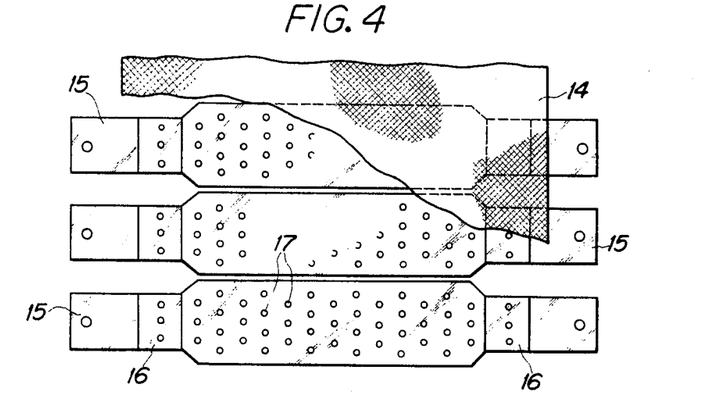
FIG. 4 is a plan view of a part of the pressure belt for use in the filter according to the present invention.
Figure 5:
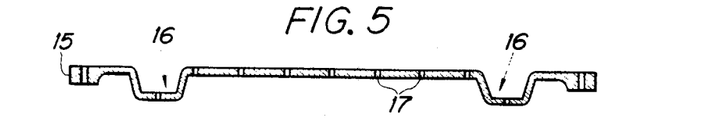
FIG. 5 is a sectional view of the pressure belt shown in FIG. 4.

The pressure belt 9 is shown in detail in FIGS. 4 and 5. The pressure belt is supported on the chain gears so as to move circularly and has chains coupled on both sides of traversely narrow pushing plates 15 to provide an endless belt. Each pushing plate 15 is formed at both ends with grooves 16 which can receive the rings 6 on the drum 1, and provided on the overall surface with a number of drain holes 17.

The pressure belts are pushed against the drum 1 by pressure rollers 18 arranged along the periphery of the drum. The pressure rollers 18 are rotatably supported on the bearing plates 19. Supporting shafts 20 for the supporting plates 19 have movable bearing portions, and the pressure belts 9 are pressed onto the drum by springs 21 mounted on the bearing portions and acting toward the center of the drum 1. The spring 21 are adjusted in such a manner that the separation between the pressure belt 9 and the drum 1 in greater at the supply side A of the substance to be disposed and is less at the cake removing side B.

The supporting shafts 20 have guides 22 positioned to form a curve similar to that formed by the group of pressure rollers and are adapted to guide rollers 23 which are outside of the chains 10, 10 of the pressure belts 9.

In addition, a water receiver 24 for collecting the water is positioned below the group of pressure rollers and a hopper 25 for supplying the substance M is positioned on the portion where the driven chain gears 11 are provided.

Once the substance M is accomodated in the hopper 25, when the driving chain gear 12 is rotated clockwise, the pressure belt 9 is moved from left to right at its upper portion to rotate the drum 1 and also to rotate the pressure rollers 18. As the distance between the pressure rollers is adjusted that the distance between the pressure belt and the drum is wider at the supply side and narrower at the output side, the substance being treated is compressed by the pressure rollers and thus the pressed out water falls in the water receiver 24. The substance when it reaches the output side is a dehydrated cake.

Since it may be necessary to increase the pushing force of the pressure belt according to the nature of the substance being treated, the spring 21 mounted on the supporting shaft 20 of the bearing plate 19 can be adjusted to set the pressure force. In the present invention, the guides 22 are mounted on the supporting shaft in synchronism with the pressure roller and the rollers 23 mounted on either end of the pressure belt are guided by this guide. Thus, the pressure belt moves in association with the pressure rollers and the distance between the pressure belt and the drum is not affected by pressure of the pressure rollers and tension of the pressure belt. This results in maintenance of the predetermined separation.

Figure 6:
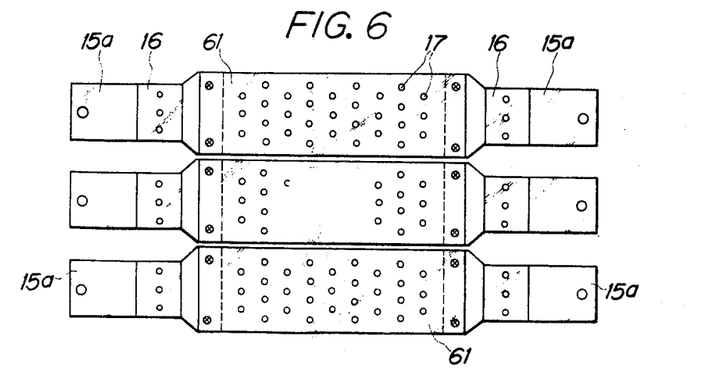
FIG. 6 is a plan view showing a part of another embodiment of the pressure belt.
Figure 7:
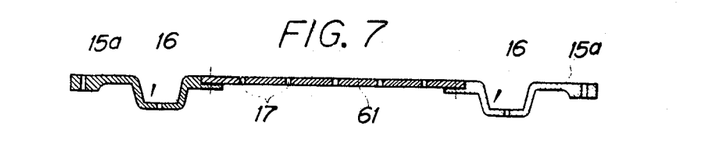
FIG. 7 is a sectional view of the pressure belt shown in FIG. 6.

Assuming that the pushing plates constituting the pressure belt are of a unitary construction, they are sufficiently strong to serve their intended purpose. However, if drums having more than 1 width are employed, pushing plates having corresponding different length must be prepared. FIGS. 6 and 7 show pushing plates comprising edge members 15a and each having grooves 16 and an intermediate plate 61 with drain holes 17 fixed to these members.

The pushing plate of this structure is usable with drums of different widths by merely adjusting the intermediate plate 61, and this is advantageous since that such pushing plates can be used for various models with the edge members 15a, 15a previously prepared.

Figure 8:
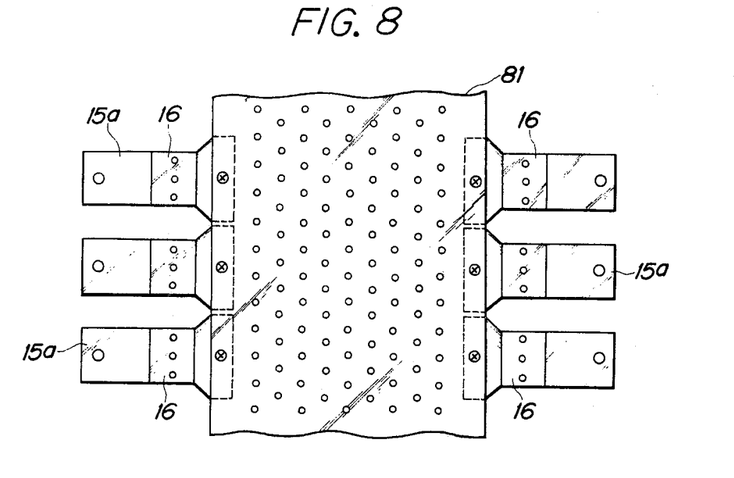
FIG. 8 is a plan view showing other embodiment of the pressure belt.
Figure 9:
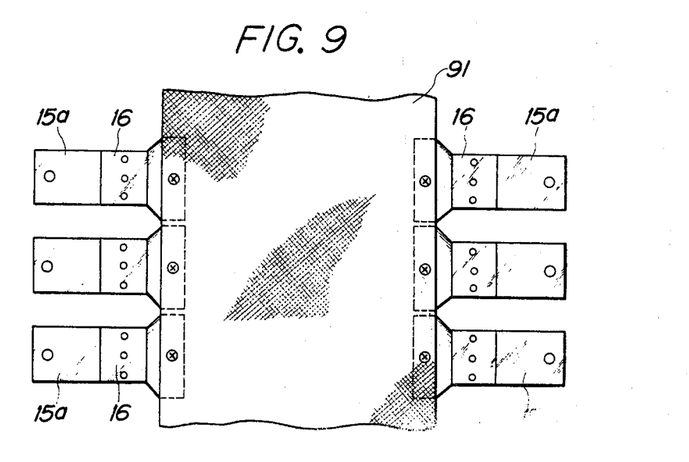
FIG. 9 is also a plan view showing other embodiment of the pressure belt.

FIGS. 8 and 9 show pushing plates of a different structure. In FIG. 8 there is shown a plate 81 made of rubber, plastic or the like which extends longitudinally of the pressure belts and is fixed between the edge member 15a. In FIG. 9, a meshy filtering plate 91 or the filtering member as mentioned above may directly be fixed between the edge members 15a.

As described above the pressure belt made of metallic materials is superior in case of dehydration by a high pressure. However, there are some substances to be disposed which can be fully dehydrated by a relatively low pressure. In such a case, use of the pressure belts shown in FIGS. 8 and 9 enables dehydration without superposition of the filtering material on the pressure belts. In case use is made of a continuous filtering plate, the width of the plate may be selected as desired and upon alteration of the drum width it is only required that the filtering plate be changed.

Figure 10:
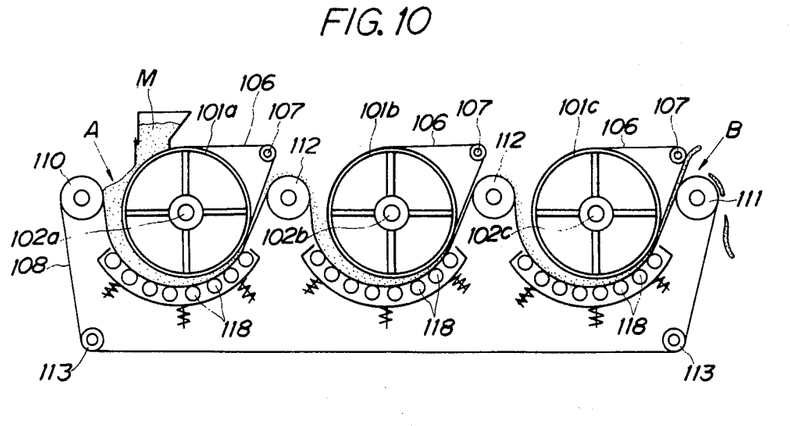
FIG. 10 is a front view showing the filter having a plurality of drums arranged therein.
Figure 11:
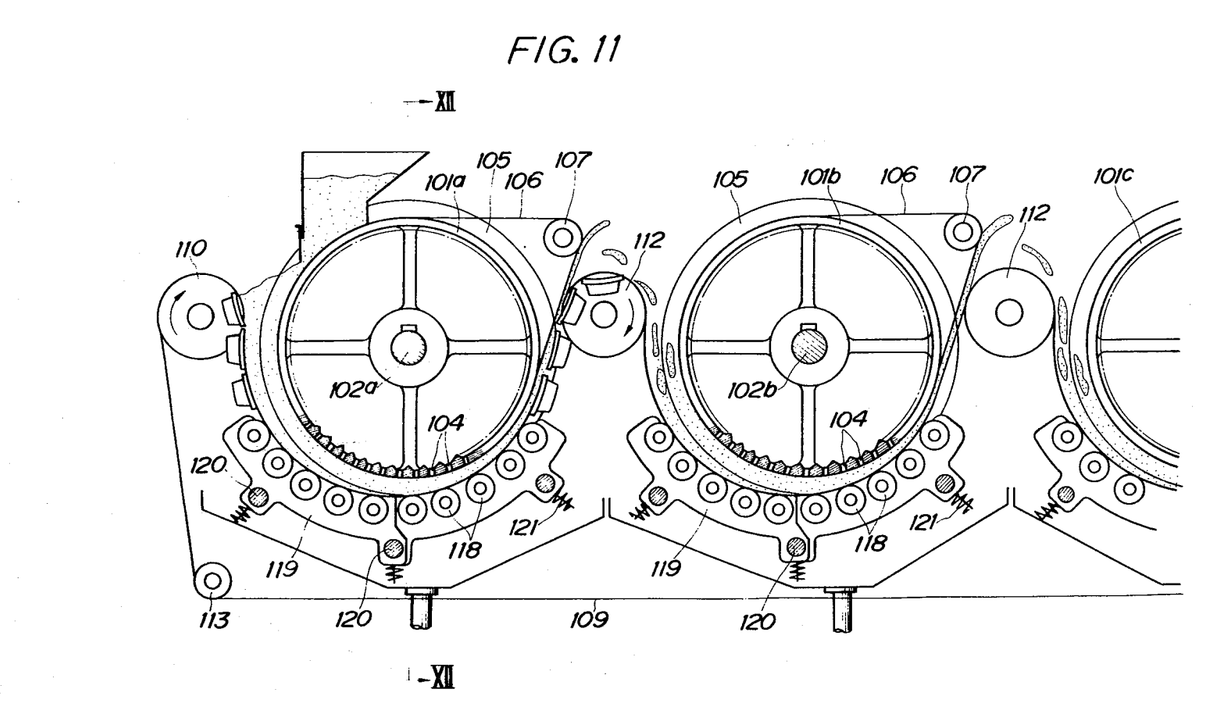
FIG. 11 is a front view showing the detail of the filter illustrated in FIG. 10
Figure 12:
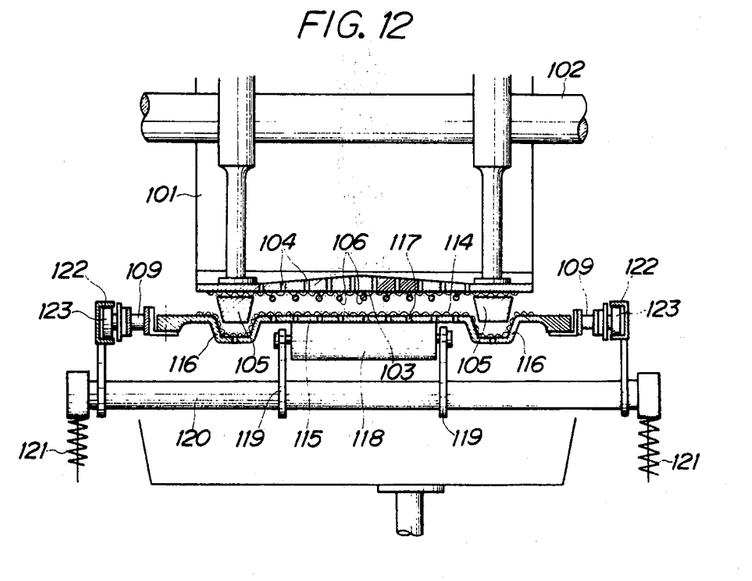
FIG. 12 is a sectional side view taken along the line XII — XII in FIG. 11.

FIGS. 10, 11 and 12 show filters each having a plurality of drums serially arranged and enabling the separation of water from the substance being treated through the sequential application of pressure.

Drums 101a, 101b and 101c are rotatably mounted on rotary shafts 102a, 102b and 102c, respectively. The drums are arranged successively in the direction perpendicular to the rotary shaft. The drums have water-permeable filtering materials 103 wound thereon and are provided at their wall surfaces with drain holes 104 so that the pressed out water enters the drums and then flows out of either side of the drums. Rings 105 made of rubber or the like are put on both edges of the periphery of the drum 101 and the pressuring operation is effected inside of these rings. A number of ropes 106 are arranged at a constant interval inside of the rings 105 on the filtering material 103, and these ropes are supported on shafts 107 near the upper part of the drum, respectively. Drums 101a and 101b serve to transport the substance to be disposed to the next drum and drum 101c serves to exfoliate the material in a form of a cake and to prevent the material from slipping.

The pressure belts 108 are endless belts and adapted to move adjacent the drum along the lower semicircular surface of the drum. The chains 109 located on either side of the pressure belts are supported on the chain gears 110 positioned at the input and output positions of the drums, the chain gears 112 positioned between drums and chain gears 113, 113 positioned at the lower portion of the filter. The chain gear 110 provided at the supply side A and the chain gears 112 provided between the drums are driven gears while the chain gears 111 provided at the cake removing side B is a driving gear. When the pressure belts are moved, every drum is rotated counterclockwise in FIG. 10. The pressure belts have thereon the filtering material 114 having a structure similar to that described above and which is effective to extract water by pressing the substance being treated.

The pressure belts have the same structure as described above. As the pressure belts are supported on the chain gears to move circularly, the belts form an endless loop by the chains 109 coupled on either edges traversely of the narrow pushing plates 115. The pushing plates 115 are provided at their lateral edges with grooves 116 which can engage with the rings 105 and have on their surface a plurality of drain holes 117.

The pressure belts thus constructed, when positioned near the periphery of the respective drums, are pushed onto the drum by the pressure rollers arranged along the periphery of the drums. The pressure rollers 118 are supported by the respective plates 119 for free rotation and the supporting shaft 120 of the bearing plate has a movable bearing portion. The springs 121 are mounted on this portion to act toward the center of the drum 101 to push the pressure belt 108 onto the drum. An appropriate adjustment is so made that the distance between the pressure belt 108 and the drum is wider at the drum 101a on the supply side, narrower at the intermediate drum 101b and narrowest at the drum 101c on the cake removing side.

Mounted on the supporting shafts 120 along the curved line of the arrangement of the pressure rollers are guides 122 curved line similar to that formed by the group of the pressure rollers and the rollers 123 mounted outside of the chains 110 of the pressure belts are guided into the guides 122.

A hopper 124 is provided on the drum 101a for supplying the substance M to be treated.

Once the substance M is accomodated in the hopper 124 and the driving chain gear 111 is rotated clockwise, the pressure belt 108 moves at its upper portion from left to right to rotate the drum 101 counterclockwise and also the pressure rollers 118 respectively. As the distance between the pressure rollers is so adjusted that the distance between the pressure belts and the drum is made wider at the supply side and narrower at the output side, the substances being treated are compressed by weak pressure at the first drum 101a, then compressed with a relatively strong compressive force at the second drum 101b and finally taken out as a dehydrated cake after reaching the final drum 101c.

Such a continuous arrangement of a plurality of drums for realizing pressure and dehydration permits repeated pressure of the substances to be disposed and accordingly desired dehydration can be expected. It is also noted that the substances to be disposed move to the next adjacent drum with their compression surfaces inversed, so that pressure is ensured with a great certainty and dehydration effect can be raised.

What is claimed is:

1. A filter comprising a rotatable drum having a plurality of perforations; a plurality of ropes encircling said drum for maintaining a substance being treated in position; a plurality of pressure rollers arranged on the periphery of said rotatable drum on supporting shafts to provide for pushing action toward said drum; a pressure belt having a plurality of perforations, said belt being formed in an endless belt and interposed between said drum and said pressure rollers; chains mounted on both sides of said pressure belt for driving said pressure belt; sealing means provided at both edges of said drum and at corresponding edges of said pressure belt; guide means mounted on the supporting shafts of the plurality of pressure rollers and so positioned that the clearance between said pressure belt and said drum is narrower at the side where the substance being treated is output than at a supply side thereof; rollers mounted on the chains and adapted to be guided into said guide means; and a means for supplying muddy substance to be treated positioned adjacent to the portion where the clearance between said drum and said pressure belt is widest the interior surface of the wall of said drum tapering outwardly from its central portion.

2. A filter comprising a rotatable drum having a plurality of perforations; a plurality of ropes encircling said drum for maintaining a substance being treated in position; a plurality of pressure rollers arranged on the periphery of said rotatable drum on supporting shafts to provide for pushing action toward said drum; a pressure belt having a plurality of perforations, said belt being formed in an endless belt and interposed between said drum and said pressure rollers; chains mounted on both sides of said pressure belt for driving said pressure belt, said pressure belt being comprised of a plurality of narrow, perforated pushing plates which are connected to each other on either side by means of the chain so as to form an endless loop; sealing means provided at both edges of said drum and at corresponding edges of said pressure belt; guide means mounted on the supporting shafts of the plurality of pressure rollers and so positioned that the clearance between said pressure belt and said drum is narrower at the side where the substance being treated is output than at a supply side thereof; rollers mounted on the chains and adapted to be guided into said guide means; and a means for supplying muddy substance to be treated positioned adjacent to the portion where the clearance between said drum and said pressure belt is widest.

3. A filter according to claim 2 wherein each pushing plate is comprised of end members connected to the chains and an intermediate plate having a plurality of perforations and positioned between said members.

4. A filter comprising a rotatable drum having a plurality of perforations; a plurality of ropes encircling said drum for maintaining a substance being treated in position; a plurality of pressure rollers arranged on the periphery of said rotatable drum on supporting shafts to provide for pushing action toward said drum; a pressure belt having a plurality of perforations, said belt being formed in an endless belt and interposed between said drum and said pressure rollers; chains mounted on both sides of said pressure belt for driving said pressure belt; sealing means provided at both edges of said drum and at corresponding edges of said pressure belt; guide means mounted on the supporting shafts of the plurality of pressure rollers and so positioned that the clearance between said pressure belt and said drum is narrower at the side where the substance being treated is output than at a supply side thereof; rollers mounted on the chains and adapted to be guided into said guide means, said guide means defining channels for guiding the rollers mounted on the chains and mounted on the supporting shafts for bearing plates provided with the plurality of pressure rollers, said shafts being supported by springs; and a means for supplying muddy substance to be treated positioned adjacent to the portion where the clearance between said drum and said pressure belt is widest.

* * * * *